April 29, 1941.  S. C. VOLNEY  2,240,446
COMBINED PHONOGRAPH AND SLIDE FILM PROJECTOR
Filed June 25, 1938  3 Sheets-Sheet 3
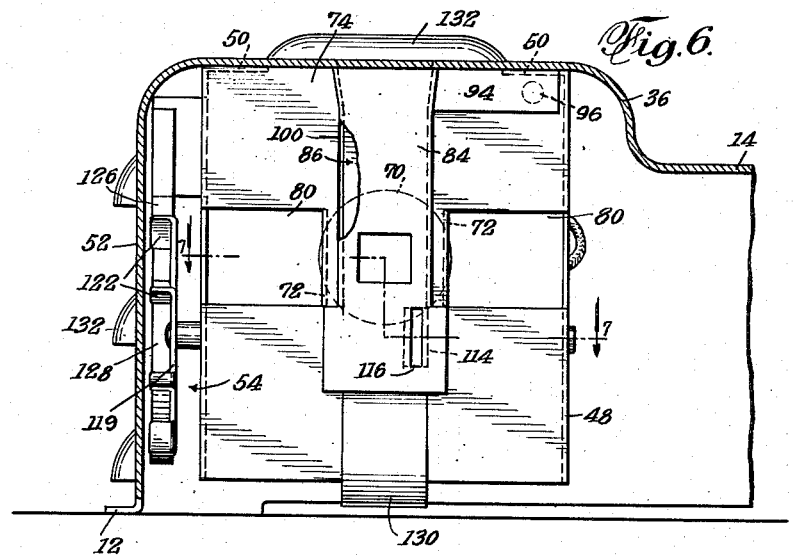
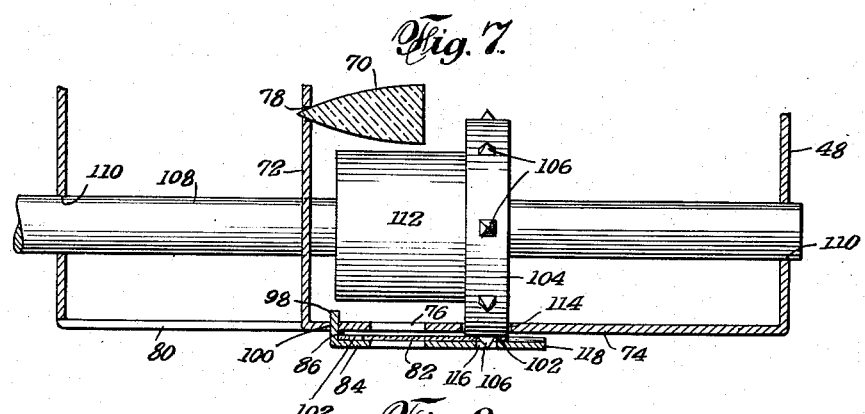
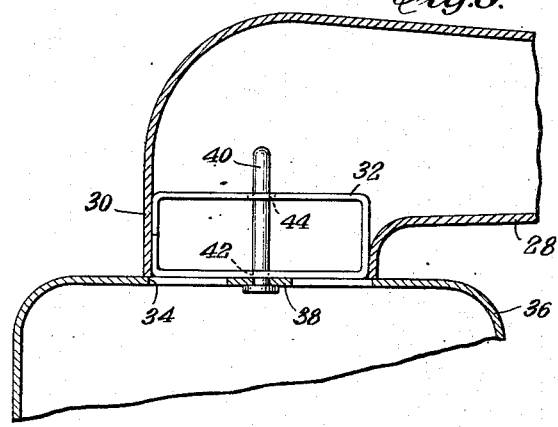
INVENTOR
SVATOPLUK C. VOLNEY
BY
ATTORNEY Patented Apr. 29, 1941

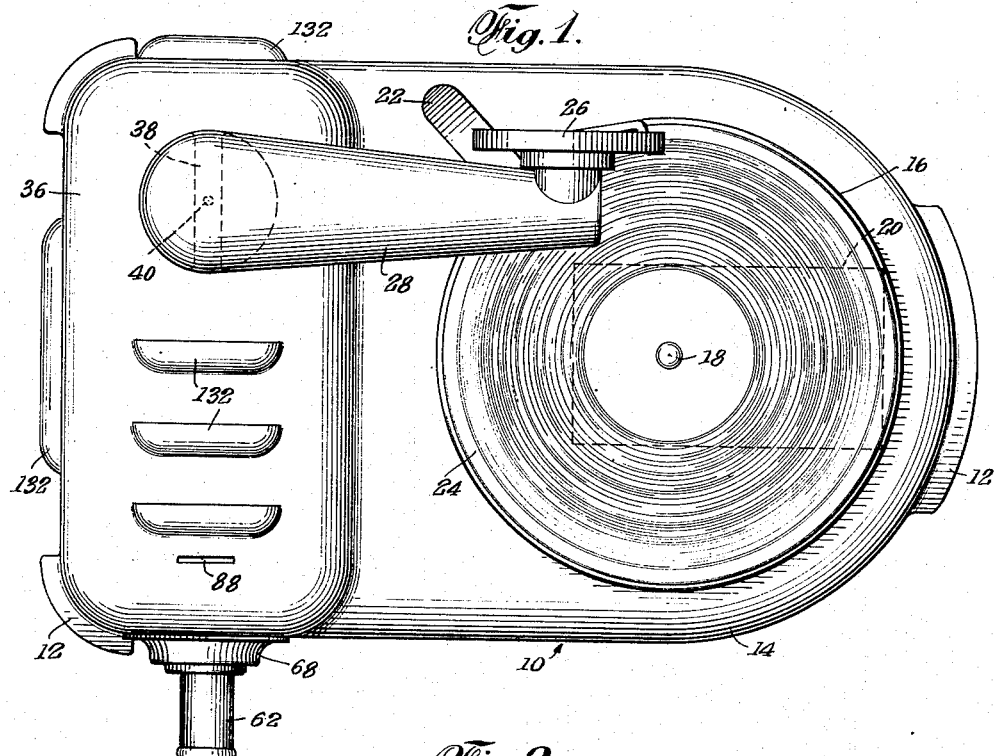
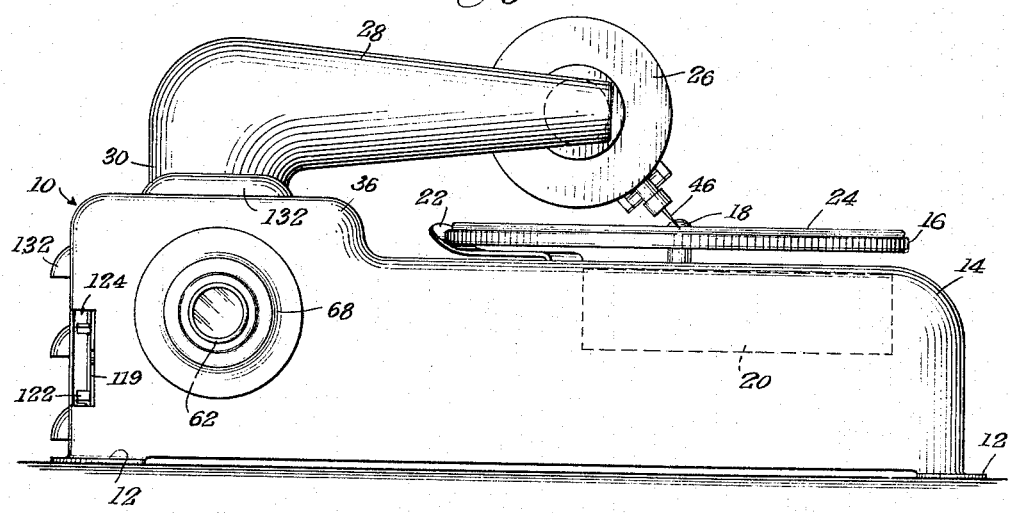

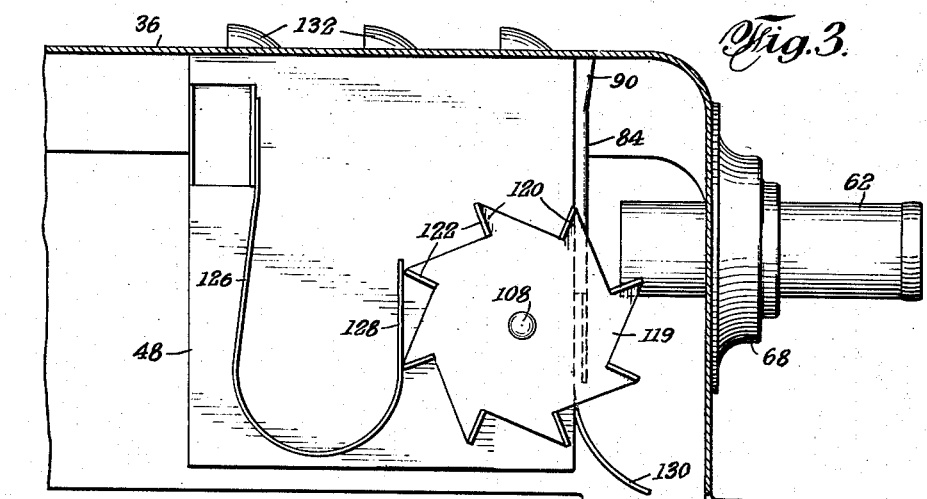
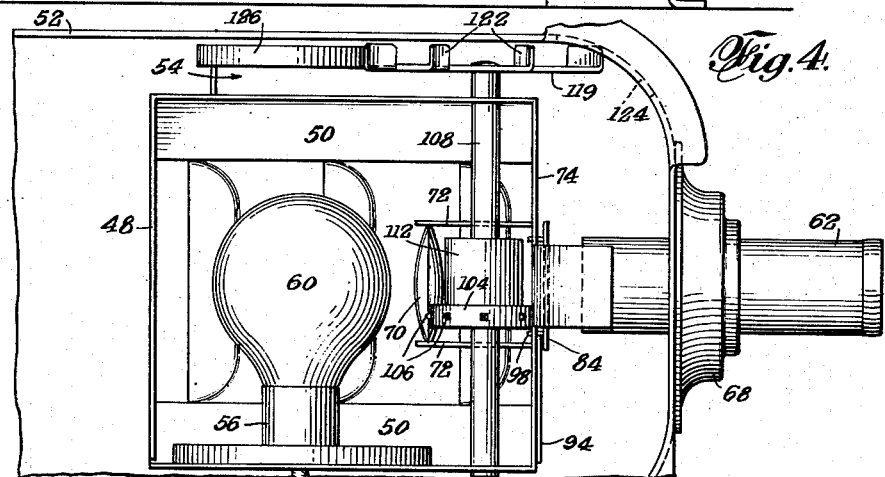
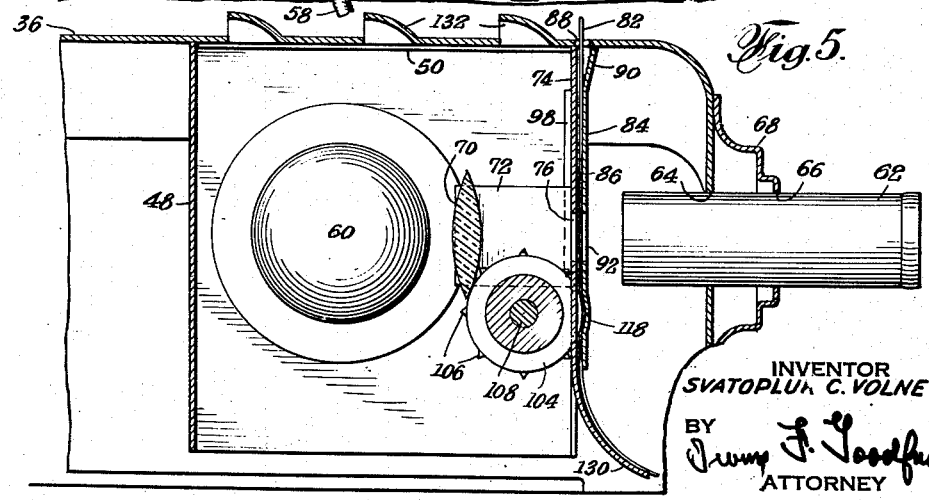

2,240,446

UNITED STATES PATENT OFFICE 2,240,446

COMBINED PHONOGRAPH AND SLIDE FILM PROJECTOR

Svatopluk C. Volney, New York, N. Y.

Application June 25, 1938, Serial No. 215,934

5 Claims. (Cl. 88—28)

The present invention relates to a combined phonograph and slide film projector of a type that is adaptable and highly desirable for entertainment and educational purposes, and it contemplates the incorporation, within one structure, of phonographic record reproducing means and picture projecting means, whereby a photographic image and a narrative description thereof may be synchronously provided by one apparatus without the use of costly, delicate and complicated mechanisms.

This invention contemplates the provision of a new method of combined visual and oral exposition, wherein the visual image is manually synchronized, by a single touch of the hand, with the phonographic reproduction of a recorded description thereof, thereby providing a simple procedure and assuring its smooth operation.

The present invention contemplates the provision of picture projecting apparatus capable of moving a multi-frame picture film strip one frame at a time, whereby it is possible to show and described a plurality of images successively, without having to remove the film or the record from the apparatus, by merely recording upon the record successive descriptions arranged to correspond to the arrangement of the pictures to which they relate on the film frames.

The present invention also contemplates the provision of apparatus of the character described having means for guiding the film before the objective lens system which also serves to urge the film strip against the film strip advancing means whereby positive engagement of the film strip by the film strip advancing means is insured.

The present invention contemplates further the provision of picture projecting apparatus which have manually operable means yielding to a single, uncontrolled pressure of the hand, for advancing a film strip, that spontaneously adjusts itself to accurately present at all times a complete film frame to the objective lens, whereby each picture on the film may be completely and accurately projected without the need of exercising any undue care.

The present invention contemplates the provision of apparatus of the character described which is of simple construction, and therefore economical to manufacture, and of compact arrangement, so that it may be easily and conveniently handled and transported, and which is generally highly useful for its purposes and possesses many other advantages which will become more apparent from the practical embodiment thereof which is illustrated in the accompanying drawings, in which Fig. 1 is a top plan view of the combined phonographic and picture projecting apparatus, the phonograph motor location being indicated in broken lines;

Fig. 2 is an elevational view of the picture projecting side of the same;

Fig. 3 is an end view of the same with the end wall removed to illustrate the manually operable film advancing means;

Fig. 4 is a bottom plan view of the same;

Fig. 5 is a vertical sectional view through the same;

Fig. 6 is a fragmentary view of the film projecting part of the view of Fig. 2, with the base wall removed;

Fig. 7 is a transverse sectional view taken along line 7—7 of Fig. 6; and

Fig. 8 is a fragmentary vertical sectional view through the phonograph arm to illustrate the manner of its arrangement upon the base of the apparatus.

In the particular embodiment of my invention which is illustrated in these drawings, a hollow, substantially flat base 10, preferably metallic, is supported on legs 12, whereby its open end is raised free of the supporting surface, to open the interior of the base to provide access thereto.

The base 10 is provided with a portion 14 which is preferably of reduced height, and serves to accommodate the sound reproducing or phonographic mechanism which consists of a turntable 16 mounted on motor shaft 18, that rises from the center of the base portion 14. Since any desirable type of motor, such as a spring motor or a high speed electric motor provided with reduction gears, may be associated with the shaft, the motor is not specifically shown, being merely indicated by the motor housing 20, within the base 10. A suitable braking member 22, for the turntable 16 to stop it at will, is also provided.

To reproduce the record 24, the sound reproducing unit 26 is provided at the end of the hollow, horizontally disposed amplifying arm 28. The arm 28 is provided with a vertically terminating end 30 which fits over and is secured to an internal supporting bracket 32, by means of which it is pivotally and tiltably secured in position over an opening 34 provided in an elevated portion 36 of the base 10, the base thereby serving as a resonance chamber.

To pivotally retain the arm in position above the opening 34, a bar 38 is carried across such opening, and an upwardly projecting pin 40 provided thereon. Suitable openings 42 and 44 are provided, respectively, in the lower and upper walls of the rectangular bracket 32 to receive the pin 40, with the opening 44 being slightly larger than the diameter of the pin 40 so that the arm 28 may not only be turned axially about the pin to permit the sound disc to follow the record, but may also be tilted upwardly to be moved without having the usual phonograph needle 46, carried by the sound reproducing unit, come in contact with the record 24.

The elevated base portion 36 also serves to house the picture projecting mechanism which is associated with the phonographic mechanism. It is arranged in a four walled rectangular frame 48 supported adjacent the roof of the base by means of roof portions or flanges 50 and spaced from the end wall 52 of the base to form a space or recess 54.

To provide the light requisite for photographic projection, a light socket 56 is arranged on one of the side walls of the frame and suitably connected to an electric cable and plug 58, and is adapted to receive, in proper position, an electric light bulb 60.

In the front wall of the base, there is provided the usual objective lens system including the objective lens containing tube 62 which is slidably arranged within an opening 64 in the base wall and an opening 66 formed in the spaced embossment 68 arranged on the base wall, whereby the objective tube 62 may be suitably supported and is movable for adjusting the clarity of the projected image. Intermediate the light 60 and the objective lens containing tube 62, there is provided the usual light condensing lens 70.

While any suitable means may be utilized to support the condensing lens 70, I prefer, for reasons of simplicity, compactness and economy, to provide, for the purpose, a pair of arms 72, extending rearwardly from the front wall 74 of the frame 48, one to each side of a light transmitting opening 76 formed therein in alignment with the light bulb 60 and the objective tube 62, each of which arms 72 is provided, adjacent its free end with a vertically arranged lens receiving slot 78. It will be apparent that these arms provide a convenient, simple and safe means for retaining the condensing lens 70 in position, into which it may be readily inserted and from which it may be readily removed by slightly pressing the arms 72 apart, against their natural resilience.

Preferably, the arms 72 may be integrally formed with the front wall by stamping out portions thereof and offsetting the same rearwardly, as illustrated, the openings 80 remaining in the front wall serving as additional means for ventilating the frame 48 to dissipate the heat of the bulb 60.

In order to properly align and guide a film strip 82 in front of the light transmitting opening 76, there is provided film guiding means which comprise preferably a guide plate member 84 arranged, vertically, in front of said opening 76 and spaced from the front wall of the frame to form the film guiding channel 86. A suitable opening 88 is provided in the roof of the base, communicating with the guiding channel to permit insertion of the film strip 82 thereinto. Preferably, for ease of introduction of the film into the guiding channel the base opening 88 and the mouth of the channel 86 are enlarged, relative the main portion thereof, by bending the upper end 90 of the guide plate 84 away from the front wall 74.

The usual image transmitting opening 92 corresponding with the light transmitting opening 76 in the front wall, is provided in the guide plate 84.

To support the plate 84 in sufficiently spaced relation from the front wall to form the narrow film guiding channel 86 and to support it resiliently in place, for purposes which will hereinafter be explained, the guide plate is indirectly secured to the front wall, by means of a sideways extending arm 94 which is offset from the upper end of the guide plate, and which is secured by its free end, as at 96, to the front frame wall 74, in any suitable manner, as by soldering, welding, or the like.

The upper portion of the guide plate may be provided with offset rearwardly extending walls 98 which are received and supported in slots 100 in the front frame wall 74, forming side walls for the guiding channel 86 to prevent lateral displacement of the film strip.

In order to advance the film strip, which comprises a plurality of separate closely arranged frames, within the guiding channel, to arrange the frames successively before the objective lens system, I provide the film strip with a plurality of regularly spaced perforations 102 along one or both of its edges, and I provide a suitably positioned rotatably mounted sprocket wheel 104 having sprocket teeth 106, which engage the film perforations to move the film strip as the sprocket wheel is rotated. Such sprocket wheel may be fixed on a shaft 108 journalled in horizontal position, parallel to the front wall 74, preferably in journal openings 110 provided for the purpose in the side walls of the frame, at a point below the light transmitting opening, so that neither the shaft nor the sprocket wheel hub 112 will interfere with the passage of the film illuminating light.

Preferably, the sprocket wheel is of a thickness substantially greater than the width of the sprocket teeth, so that film supporting shoulders are provided on each side of the teeth.

In order to have the sprocket teeth engage the film perforations for moving the film, a suitably positioned slot 114 is provided in the front wall 74 of a width sufficient to accommodate the edge of the sprocket wheel, whereby the film is exposed for engagement by the sprocket teeth. A corresponding slot 116 of lesser width is provided in the lower unsupported part of guide plate 84, whereby the sprocket teeth are permitted to project beyond the film strip to thus obtain a sufficient grip on the film.

It will be apparent that the guide plate 84 which is resiliently mounted, as explained above, and which is free hanging at the point of the slot 116, will have the edges of such slot resiliently urge the film against the edge of the sprocket wheel on each side of its teeth, and thus assure positive and certain engagement of the film perforations by the sprocket teeth.

To simplify the construction of the apparatus, and to prevent undue weakening of the film strip, I prefer to have each film frame provided with but a single perforation arranged, preferably at its center, and to arrange the sprocket teeth a corresponding distance apart. And to assure positive engagement without slipping, at all times, I make the height of the corresponding slots 114 and 116 equal at least to the distance between two of the film perforations, and preferably slightly in excess of such distance, so that a second film perforation will always be presented for film engagement within the slots, before a prior perforation has been moved out therefrom.

To further assure the engagement of the film strip by the sprocket wheel 104, I arrange the latter to have its edge project slightly through the slot 114 in the front wall, as clearly shown in Fig. 5, and I accordingly curve or arch the corresponding part 118 of the free hanging portion of the guide plate to accommodate the projecting part of the sprocket wheel. It will be apparent that the curved part 118 of the guide plate will cause the film to be curved and to drape itself along the edge of the sprocket wheel so as to be engaged by a sprocket tooth as soon as it is presented into the opening 114 and continue to be engaged by such tooth substantially until the tooth is withdrawn from the opening 114. I thus assure certain and continuous engagement of the film strip by the sprocket wheel and obtain uninterrupted movement thereof.

I now provide means for accurately moving the film strip the exact distance of one frame at a time, and which spontaneously dispose and hold the film strip in position as it is moved forward, to accurately successively present each frame to the objective lenses. To accomplish this purpose, I extend the sprocket wheel shaft 108 into the recess 52 and mount on the projecting end, within the recess 52, a shaft turning ratchet wheel 119 which is provided with teeth 120 so arranged that the portion of the arc between any two adjacent ratchet teeth is equivalent to one frame on the film strip, so that when the ratchet wheel 119 is moved a distance equal to the arc between two of its adjacent teeth, the shaft and sprocket wheel 104 will be rotated sufficiently to advance the film exactly one frame.

To enable the manual operation of the shaft turning ratchet wheel 119, each of its teeth is provided with an offset flange 122 capable of being manually grasped or otherwise engaged, and the base 10 is provided with an opening 124 in suitable position to expose the ratchet wheel 119 for manual operation.

The size of the opening 124 is so arranged that its height is more than one time the distance and less than one and one half times the distance between two of the teeth 120, so that at all times one and only one of the flanges 122 is exposed therein in position for manual engagement and that the lower end of the opening 124 limits the movement of such flange 122, at each operation, to a distance no greater than sufficient to advance the film strip one frame at a time.

I also provide within the recess 52, in alignment with the wheel 119, a leaf spring 126, which is secured in fixed position by one end at the rear of the recess, its free end 128 being reentrantly bent to form a substantially U-shaped spring member and engaging the edge of the ratchet wheel 119. It will at once be clear that the pressure of the spring against any single wheel tooth 120 will automatically tend to turn the wheel and will continue to turn it until it is in position to have two of its teeth 120 in alignment and simultaneously in contact with the free spring arm 128, in which position the wheel will be spontaneously brought to rest by the action of the spring arm 128.

In my preferred embodiment, I, therefore, provide the ratchet wheel with a number of ratchet teeth equal to the number of sprocket teeth found on the sprocket wheel and mount it on the shaft in such relation to the sprocket wheel teeth and film perforations that whenever two ratchet teeth 120 of the shaft turning wheel 119 are simultaneously engaged by the spring arm 128 a film frame is accurately positioned for projection in front of the objective 62. It will at once be clear that when a film strip is engaged upon a sprocket tooth, it may be advanced by pressing against the particular tooth flange 122 that happens to be exposed within the base opening 124 and moving it a sufficient distance to have its proper ratchet tooth pass the critical pressure point on the spring arm 128. Automatically, the pressure of the spring will continue to turn the ratchet wheel 119 until a second tooth is brought into contact with the spring arm to neutralize its pressure, and thus spontaneously advance the film strip the distance of a frame, to position the next adjacent frame for projection through the objective. The size of the opening 124, as explained above, will prevent the manual movement of the wheel, at any one operation, in excess of the distance required to advance the film one frame.

It may here be stated that instead of direct manual actuation of the ratchet wheel, mechanical means, many types of which will readily suggest themselves to a skilled mechanic, may be employed, as for instance a self returning plunger which may be arranged to engage the ratchet teeth to move the ratchet wheel the requisite distance upon each operation.

In practice, a plurality of photographs or images are arranged on a perforated transparent film strip in adjacent individual frames. Usually between eighteen and twenty-four frames are arranged on one film strip. Descriptions or narratives of the photographed objects are then recorded on one or more phonograph records, in the order in which the related photographs are arranged, with a description of the lowermost image on the film being recorded first. In recording the narratives on the record or records, a signal sound is preferably introduced between successive narratives to indicate the end of one narrative and the beginning of the following one.

In operation, the film is inserted, with its lowermost frame foremost in the guiding channel and is engaged upon the sprocket wheel 104 and the sprocket shaft rotating wheel 119 moved until the image of the first frame is projected through the objective. Concurrently, the related record is arranged on the turntable and played. As soon as the narrative relating to the first image is completed the signal sound is heard, apprising the operator of the ending of the narrative. The operator then moves the film to the next frame by a single, substantially instantaneous, relatively uncontrolled pressure of a finger on the flange 122 exposed within the opening 124, and the new view is projected through the objective substantially simultaneously with the commencement of the playing of its associated narrative, without need for any care or adjustments of the film on the part of the operator.

The film strip is guided out of the apparatus by means of the curved extension 130 of the front frame wall, which directs it forwardly and outwardly into the space between the edge of the base wall and the supporting surface, and it may here be added that the base portion 36 may be provided with a plurality of louver openings 132 for dissipating the heat generalized by the hub 60.

While I have described my invention as exemplified by one embodiment thereof, it is to be understood that such embodiment is illustrative only and that my invention is not to be limited thereto, since many modifications thereof, within the spirit and scope of the invention, will be apparent to those skilled in the art. Hence, I intend to claim my invention as broadly as may be permitted by the state of the prior art and the terms of the appended claims.

I claim:

1. A device of the character described comprising a phonograph having a hollow base and adapted to play a record having a plurality of successively arranged narratives recorded thereon and a strip film projector arranged in the base for projecting photographic illustrations of said narratives upon a screen, said projector comprising a light source, an adjustable objective lens system arranged adjacent the light source, means for guiding in operative position relative to the light source, and the lens system, a film having the narrative illustrating images arranged thereon in successive frames, said film strip having regularly spaced perforations along the edges thereof and said film strip having for each frame thereon a selected number of said perforations, a shaft rotatably arranged in the base, a sprocket wheel secured to the shaft, teeth on the sprocket wheel engaging the film perforations, said sprocket teeth spaced from each other an angular distance corresponding to the distance separating the film perforations, and a member secured to the shaft for manually causing rotation thereof, said member having arranged thereon flanges adapted to be manually grasped, said flanges spaced from each other an angular distance corresponding to the length of one frame, said base having an opening therein for disposing only one of said flanges in position to be manually grasped in any operative position of the shaft.

2. A device of the character described comprising a phonograph having a hollow base and adapted to play a record having a plurality of successively arranged narratives recorded thereon and a strip film projector arranged in the base for projecting photographic illustrations of said narratives upon a screen, said projector comprising a light source, an adjustable objective lens system arranged adjacent the light source, means for guiding in operative position relative to the light source and the lens system a film strip having the narrative illustrating images arranged thereon in successive frames, said film strip having regularly spaced perforations along the edges thereof, said film having for each frame thereof a selected number of perforations, and means for intermittently successively advancing the said film strip within the said guiding means, said film strip advancing means including a sprocket wheel having teeth positioned to engage the film perforations to move the film strip upon rotation of the sprocket wheel, and a sprocket wheel turning member having a plurality of flanges adapted to be manually grasped to operatively move the member, said member arranged to dispose only one of said flanges in position for manual engagement at any operative position of the sprocket wheel, the flanges being spaced from each other on the member an angular distance corresponding to the distance moved by one frame upon rotation of the sprocket wheel by the member.

3. In a slide film projector having a base, means for intermittently and successively moving for projection a film strip having images arranged thereon in successive frames, said film strip having regularly spaced perforations along the edges thereof, one perforation being provided for each frame, said moving means comprising a shaft rotatably mounted in the base, a sprocket wheel secured to said shaft, spaced teeth arranged on the sprocket wheel to engage the film strip perforations for moving the film strip, said sprocket wheel teeth being spaced from each other an angular distance corresponding to the distance between the film perforations and a manually operated shaft turning ratchet wheel on the shaft, said ratchet wheel having spaced-apart flanges adapted to be manually grasped, said flanges spaced from each other an angular distance corresponding to the distance between the film perforations and corresponding in number to the number of teeth arranged on the sprocket wheel, said base having an opening therein of size and relative arrangement to dispose only one of said flanges in a position to be manually grasped at any operative position of the shaft.

4. The projector of claim 3 and including a spring secured to the base and manually engaging more than one ratchet wheel tooth to thereby maintain the ratchet wheel in a position of rest, said spring when in engagement with only one ratchet wheel tooth arranged to urge rotation of the ratchet wheel, said film perforations, sprocket wheel teeth and ratchet wheel teeth arranged relatively to each other to position a film frame for projection when the spring is in normal engagement with the ratchet wheel teeth.

5. The projector of claim 3 and including a leaf spring secured at one end to the base, the other end of the leaf spring being free and reentrantly bent to form a substantially U-shaped spring member, said free end normally engaging two ratchet wheel teeth to thereby maintain the ratchet wheel in a position of rest, the film perforations, sprocket wheel teeth and ratchet wheel teeth arranged relatively to each other to position a film frame for projection when the free end of the spring is in normal engagement with two ratchet wheel teeth, said free end of the spring member arranged to urge rotation of the ratchet wheel when in engagement therewith in any position other than said normal position.

SVATOPLUK C. VOLNEY.